C. P. LANDRETH.
APPARATUS FOR TREATING LIQUIDS.
APPLICATION FILED JULY 14, 1915.
1,201,202.
Patented Oct. 10, 1916.
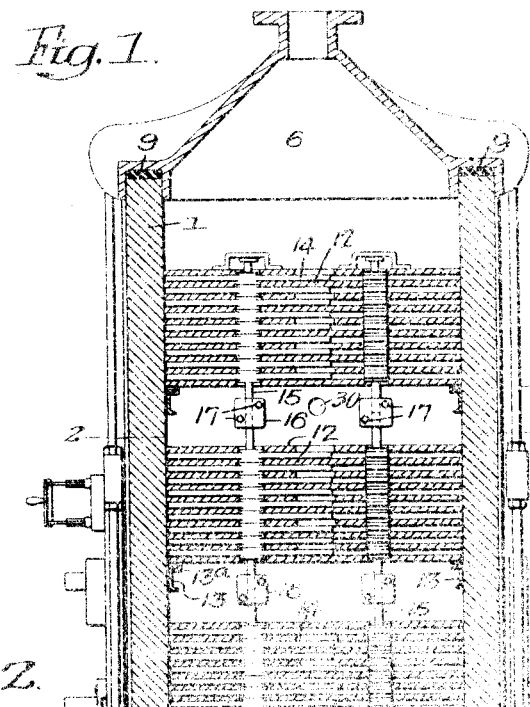
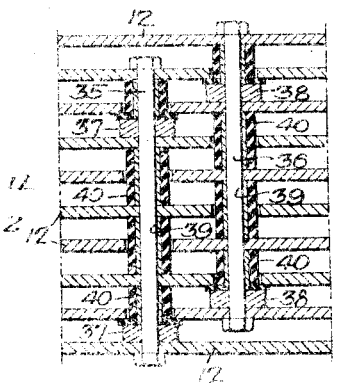
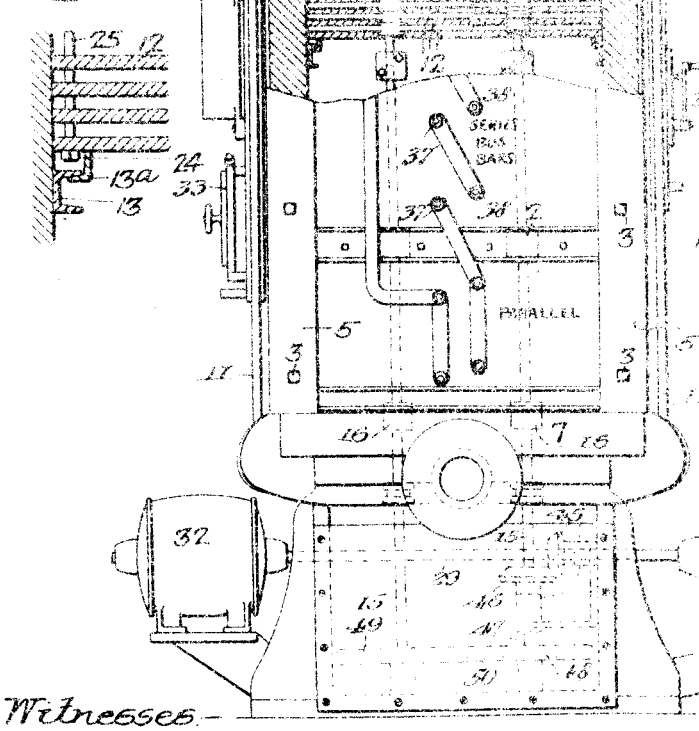
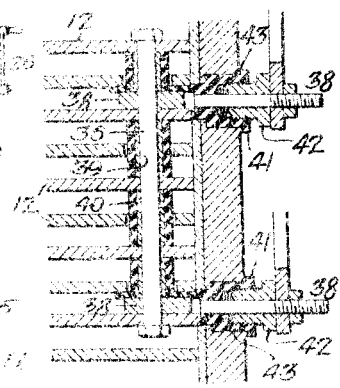
Witnesses
Charles H. York
Wills & Burns
Inventor
Clarence P. Landreth
by his Attorneys
Anson & Anson C. P. LANDRETH.
APPARATUS FOR TREATING LIQUIDS.
APPLICATION FILED JULY 14, 1913.
1,201,202.
Patented Oct. 10, 1916.
3 SHEETS—SHEET 2.
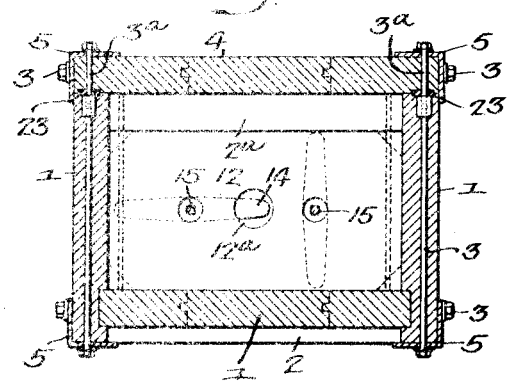
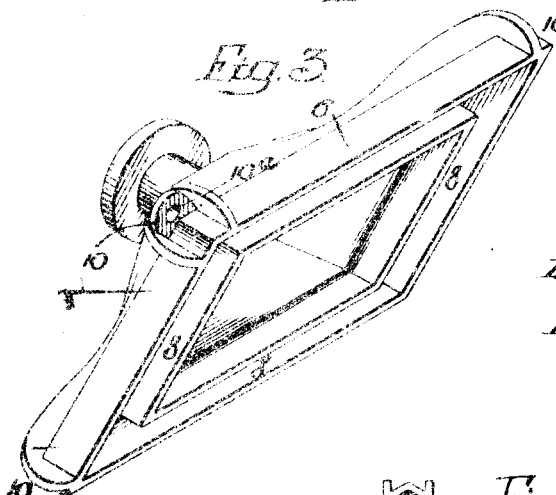
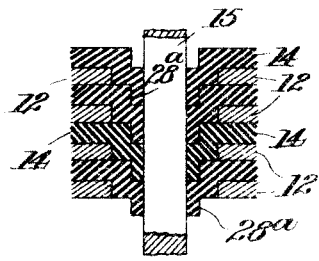
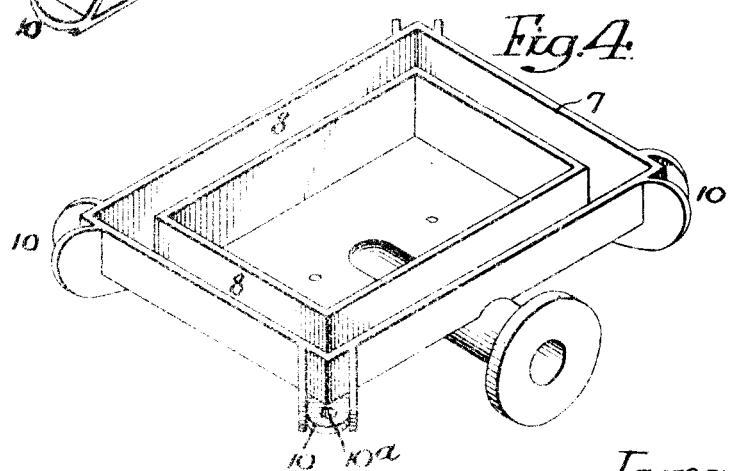
Witnesses
Walter Clime
Inventor—
Clarence P. Landreth
by his Attorneys
Howson & Howson

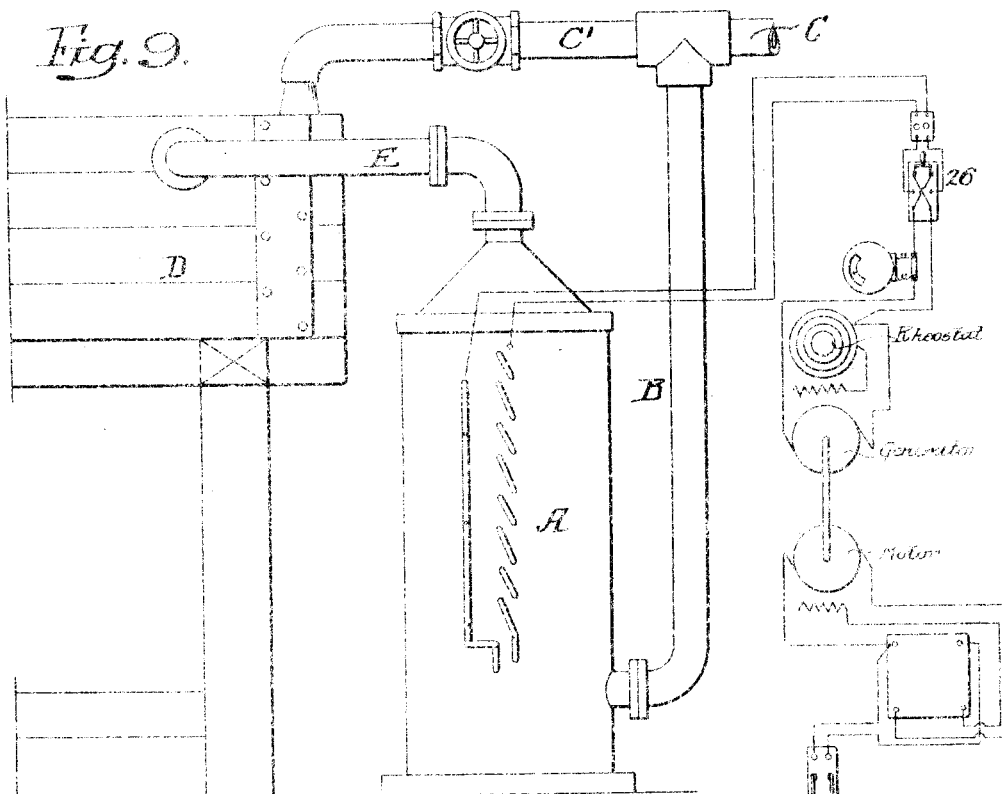
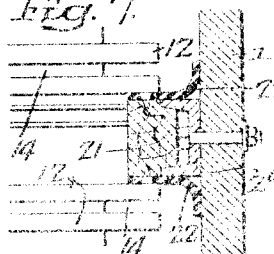
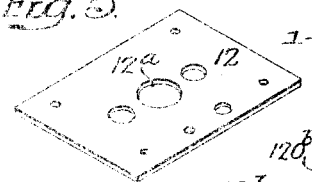
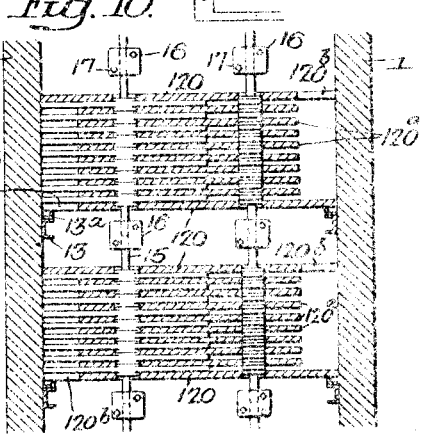
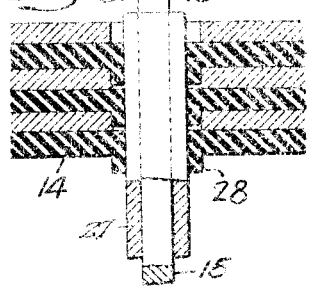
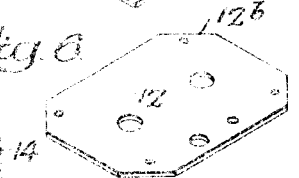
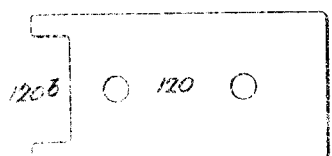

UNITED STATES PATENT OFFICE.

CLARENCE P. LANDRETH, OF PHILADELPHIA, PENNSYLVANIA.

APPARATUS FOR TREATING LIQUIDS.

1,201,202.  Specification of Letters Patent.  Patented Oct. 10, 1916.

Application filed July 14, 1914. Serial No. 851,024.

*To all whom it may concern:*

Be it known that I, CLARENCE P. LANDRETH, a citizen of the United States, residing in Philadelphia, Pennsylvania, have invented certain Improvements in Apparatus for Treating Liquids, of which the following is a specification.

My invention relates to that treatment of liquids for various purposes which involves the employment of electricity with or without the use of chemical agents; such treatment being principally applicable and valuable for rendering contaminated water potable, or for rendering chemically objectionable water available for uses in the arts.

My present invention comprises an apparatus in which my improved process or treatment can be carried out, in which apparatus a plurality of electrodes are arranged in separate banks or sets suitably connected and insulated so that in the case of wear, breakage, short circuiting, or any accident occurring in one bank or set, the plates comprising such bank or set may be cut out of circuit or otherwise disposed of without interfering with the operation of the apparatus and the process involved. With my improved apparatus I provide means for keeping the electrodes in a proper electrical condition, and for agitating the water or other liquid undergoing treatment whereby movement of such liquid, independently of the force of its flow may be imparted thereto.

A further feature of my invention is to provide means for introducing chemicals for action upon the liquid being treated, and a still further object is to provide an apparatus for treating small quantities of liquid which may be subsequently employed to treat larger quantities of the same.

These and other features of my invention are more fully described hereinafter, reference being had to the accompanying drawings, in which:

Figure 1, is an elevation, partly in section, of my improved water treating apparatus; Fig. 2 is a sectional plan view on the line 2—2, Fig. 1; Fig. 3, is a perspective view of the cap plate or cover of the apparatus; Fig. 4, is a perspective view of the base or bottom of the same; Figs. 5 and 6, are perspective views of plates or electrodes which I may employ; Fig. 7, is a sectional view illustrating a form of closure interposed between the banks or sets of electrodes; Fig. 8, is a sectional view of the electrodes, showing the rotating elements between the same and protective means for the shaft driving said elements; Fig. 8ª is a similar view illustrating a modified form of protective means; Fig. 9, is a diagrammatic view illustrating the use of my improved apparatus for treating electrically a small body of liquid by-passed from a larger body, which larger body is subsequently acted upon by the electrically treated portion of the liquid; Fig. 10, is a sectional view illustrating electrodes of modified form; Fig. 11, is a view of one of the electrodes employed in the structure shown in Fig. 10; Fig. 12, is a view showing means for supporting the sets of electrodes within the treating chamber, and Figs. 13 and 14, are views illustrating the electrical connections for the plates.

In the present apparatus, the side walls 1 are of wood, preferably of considerable thickness; suitably braced by cross-bars 2, and bolted together by bolts 3, so as to insure strength and rigidity, while a cover plate or door 4 is also secured by bolting; one set of bolts having additional sections 3ª for removably securing said door in place. The structure is also provided with angular corner pieces 5 which serve to vertically stiffen the same. A top or cap 6, and a bottom or base 7, preferably of metal, have recessed edges 8, to receive the side walls 1; packing 9 being preferably interposed between the bottom of said recesses and said side walls. The top 6 and base 7 are provided with corner lugs 10, apertured at 10ª for the reception of adjustable tension bolts 11 whereby the walls of the casing may be rigidly confined between the same.

A plurality of banks or series of electrodes 12 are contained within the casing, and their arrangement is substantially the same as that illustrated in my Patent No. 1,095,893, dated May 5, 1914; the present plates being oblong in shape and substantially filling the cross sectional area of the casing. To provide for circulation of liquid between these plates, alternate plates are provided with apertures 12ª, which may be centrally disposed, while the others have their corners removed at 12ᵇ, as shown in Figs. 5 and 6.

I do not desire to be limited to such form of plates or electrodes, however, and in Figs. 10 and 11, I show an arrangement of electrodes in which the top and bottom electrode 120 of each set is so arranged as to cause the liquid to flow from side to side of the casing, (Fig. 11,) the plates 120ᵃ disposed between the plates 120 being somewhat shorter so as to provide the necessary space for the passage of liquid in its flow from side to side of the apparatus. The plates 120 are cut away as indicated at 120ᵇ. The plates are suitably secured together in sets or banks, as in my patented structure, and each set or bank is independently supported by suitable rails 13 carried by the side walls of the casing, as hereinafter described. The apparatus is provided with rotating members 14 disposed between the plates or electrodes to agitate the liquid between and adjacent to said plates; said members being driven by shafts 15. These shafts are preferably arranged in short sections which may be connected together by suitable couplings comprising sectional blocks 16, recessed or apertured to receive the shaft ends and connected together by bolts 17.

The casing of the structure being of wood, it is necessary to provide means to insure the closing of the same by the door 4, at one side or the other as may be most convenient or desirable. In order to permit the employment of wood or similar material for the door, it is essential that the same be braced, and such bracing, which is generally in the form of channel or angle iron 2ᵃ, requires space within the casing. To insure that the door when set up will be in proper relation to the banks of electrodes and to avoid contact of the metal braces with the electrodes, I provide cover pieces 21 of wood or other insulating material for said braces 2ᵃ which, with the cover pieces, lie in the spaces between the respective banks of electrodes and out of the way of the same. To insure travel of the liquid undergoing treatment in contact with the plates or electrodes and to avoid any short circuiting of the flow of the water or other liquid which might take place by reason of its contact with the metal braces, I provide the spaces adjacent the door with flaps 22 which are carried by the wooden cover pieces 21 and overlie the plates in such manner to insure that the pressure of the liquid will keep them in place. While this arrangement leaves pockets adjacent the sides of the plates or electrodes receiving small bodies of liquid, these bodies are constantly changing and therefore do not impair the efficiency of the apparatus. The flaps 22 serve also as packing means, and the described construction is particularly desirable inasmuch as I employ packing in the form of an elastic gasket 23 between the door and the casing, and space must be left for compression of said gasket when the door is finally closed liquid tight.

In the use of the rails 13 upon which the plates rest, provision must be made for the accommodation of nuts 24 of spacing bolts or tie rods 25 connecting the plates 12 together. To this end said rails, which are preferably channel-form to add stiffness and strength to the structure have angle pieces 13ᵃ secured to their upper flanges, which angle pieces form upwardly projecting supporting ledges disposed a slight distance inward from the walls of the casing.

The banks of electrodes are entirely independent and separable from each other, and each set of rotating members 14 of each bank has an independent shaft polygonal in shape; a square shaft being preferred, and the shafts of adjoining banks are connected together by the box couplings 16 before referred to, which couplings are readily separable when it is desired to withdraw from the casing any bank of electrodes. By independently supporting each bank or set of electrodes by the rails 13, 13ᵃ, any one may be removed without affecting the others. I employ banks of electrodes comprising suitable plates which, during the operation of the apparatus, are alternately positive and negative, depending upon the direction of the current, and these plates are spaced apart for the reception of the members 14 carried by the shaft 15 to which movement is imparted by suitable means whereby said members may be rotated with respect to the plates. The plates are apertured for the passage of the shaft and for the disposition of the hubs of the paddles; the preferred construction being illustrated in the enlarged sectional views, Figs. 8 and 8ᵃ. The electrodes employed are of different polarity; the plates of one polarity alternating with plates of the opposite polarity, and disposed in the circuit leading from the source of electrical energy is a suitable pole-changing switch 26 whereby the current may be so directed that one set of plates act as cathodes for a certain length of time, while the other set of plates act as anodes during the same period of time, and then by changing the poles, the anodes become the cathodes, and the cathodes (of the former condition) become the anodes. The members 14 disposed between the respective plates serve the purpose of agitating the water or other liquid being treated independently of its flow and serve to distribute or carry into the flowing water or other liquid any deposit loosened from the plates and prevent accumulation of foreign matter thereon.

In practice, owing to the danger of electrolytic corrosion, it is impracticable to employ a shaft of corrodible metal unless the same be protected from contact with the plates. I have found, however, that the shaft may be fully protected by casing it with suitable insulating material, so that I am enabled to employ a metal for the shaft having the desired strength and yet prevent destruction of the same. The casing indicated at 27, Fig. 8, preferably follows the contour of the shaft, and the elements 14 mountd upon this casing have hubs 28 nesting in the succeeding elements, thereby affording additional insulation for the shaft. The casing may be omitted, however, and the rotating elements may have hubs 28ª nesting in each other, as shown in Fig. 8ª. The electrodes employed in this particular form of the apparatus may be of carbon, or of suitable metals, such as mild steel, aluminum, copper, tin, etc.

In my improved apparatus, the plates of each polarity may be connected together by bolts 35 and 36, and binding posts 37 and 38, respectively, are attached to these bolts, as shown in Figs. 13 and 14. These bolts are in electrical contact with alternating plates, as indicated in the drawings; the other plates of the different polarity being apertured for the reception of metallic collars 39 directly adjacent the bolts, which collars are in turn surrounded by insulating sleeves 40. The binding posts extend through the shell of the vessel, and the apertures for the same have insulated bushings 41, which in turn receive gland nuts 42, with suitable packing 43 surrounding said binding posts so as to insure against leakage at such points.

In Fig. 9, I have shown an arrangement of my improved apparatus for electrically treating liquid, in which the treating chamber is indicated at A and receives via a pipe B a certain portion of the whole of a predetermined body of liquid to be treated entering from a main C, which also delivers directly to the final treating receptacle D, through a pipe C'. The by-passed liquid after its electrical and chemical treatment in the chamber A passes via a pipe E to the receptacle D for action upon the greater volume of untreated liquid within the same received directly from the pipe C'. It will be understood, of course, that the treating chamber A and its operation is of a character precisely similar to that illustrated in Fig. 1.

I have also discovered in treating waters for boiler and other softening purposes containing scale forming matter in solution that the effect of the current in an insulated container is to effect the particles in suspension; rendering them unusually chemically active. In view of this condition, I may inject, by suitable means, such for instance as a pump, any suitable chemical reagent, which may be delivered at the point 30 just below the upper bank of electrodes, or above, when it is desired to further treat the water by the upper bank of electrodes. When injected below these upper electrodes they are cut out of circuit and serve as baffle plates, causing a thorough commingling of the reagent and the electrolyzed particles of the water treated while contained within the insulated casing. This causes a precipitation of the particles of scale forming materials previously in suspension. By means of the hydroxid furnished from the electrically active plates, quick sedimentation or filtration is rendered possible.

As most waters requiring treatment are good conductors, it has heretofore been found necessary when using the usual current available to insert resistance, causing a loss of electrical energy. To avoid this and make the apparatus self-contained, I may extend the driving shaft 29 from an operating motor 31 through the base of the apparatus and connect therewith a suitable generator 32, and by means of a rheostat 33 I am enabled to govern the current delivered according to the needs of the varying conductivities of the waters to be treated.

The shafts 15, carrying the rotating members 14, are driven by the following means: The shaft 29 carries a bevel pinion 45, meshing with a bevel pinion 46 on a vertical shaft 47, which carries at its lower end a pinion 48. At the lower ends of the shafts 15, gear wheels 49 and 50, in driving engagement, are secured, and one of these gear wheels is driven by the pinion 48 on the lower end of the vertical shaft 47.

As this application contains matter in common with an application filed by me Aug. 2, 1912, Serial No. 712,971, (patented July 20, 1915, No. 1,146,942) it is to be treated as a continuation of said prior application as far as the common subject-matter is concerned.

I claim:

1. The combination of a casing forming a treating chamber, banks of electrodes therein, rotating blades disposed between and in surface contact with adjacent electrodes, means for driving said blades, and an electric generator also actuated by said driving means and in circuit with said banks of electrodes.

2. The combination of a casing forming a treating chamber, banks of electrodes therein, rotating blades disposed between and in surface contact with adjacent electrodes, a source of electrical energy, an electric motor for driving said blades deriving energy from said source, and an electric generator driven by said motor and connected in circuit with said electrodes.

3. The combination with a treating chamber having banks of electrodes therein, of rotating blades of insulating material disposed between and in surface contact with adjacent electrodes, a motor generator in circuit with said electrodes for passing current therethrough, and a mechanical connection between said motor generator and said blade operating mechanism for driving the latter.

4. The combination of a treating chamber, means for passing liquid through the same against the force of gravity, banks of horizontally disposed electrodes mounted therein, flat rotatable cleaning elements of insulating material between and in surface contact with pairs of adjacent electrodes, and means exterior of the chamber for driving said rotatable elements.

5. The combination of a casing providing a chamber, means for passing liquid through said chamber, a plurality of electrodes arranged in sets and mounted in the chamber of said casing, vertical driving shafts passing through said electrodes from top to bottom of the casing, means for driving said shafts, and rotatable blades disposed between and in surface contact with pairs of adjacent electrodes and driven by said shafts, said blades being of insulating material and serving to insulate the electrodes from said shafts.

6. The combination of a vertical casing providing a chamber, a plurality of horizontally disposed electrodes arranged in sets and mounted in the chamber of said casing, means for insulating said electrodes from the casing, vertical driving shafts passing through said electrodes, means for driving said shafts, rotatable cleaning blades disposed between pairs of adjacent electrodes, said blades being mounted on and driven by said shafts, insulating means interposed between said electrodes and the shafts, and protective means interposed between the shafts and the rotatable blades, and means for supporting the separate sets of electrodes independently of the shafts.

7. The combination of a vertical casing providing a chamber, a plurality of horizontally disposed electrodes arranged in sets and mounted in the chamber of said casing, driving shafts passing through said electrodes, rotating cleaning blades disposed between pairs of adjacent electrodes and driven by said shafts, hubs carried by said blades and interposed between the shafts and said electrodes, and brackets carried by the walls of the casing for supporting said banks of electrodes independently of the driving shafts.

8. The combination of a casing having a bottom inlet and a contracted top outlet, a plurality of banks of electrodes mounted in said casing and insulated from the latter, a source of electricity in circuit with said electrodes, rotating blades disposed between adjacent electrodes, means for driving said blades to agitate liquid passing through the apparatus, and means for introducing chemicals into said liquid prior to its discharge from the apparatus.

9. The combination of a casing, a plurality of sets of electrodes mounted in said casing, rotating blades or paddles disposed between adjacent electrodes, means for driving said electrodes, means carried by the walls of the casing for supporting said electrodes, and flexible flaps disposed between said sets of electrodes for diverting the liquid passing through said casing.

In testimony whereof, I have signed my name to this specification, in the presence of two subscribing witnesses.

CLARENCE P. LANDRETH.

Witnesses:
MURRAY C. BOYER,
WM. A. BARR.